F. B. GLOVER.
DIVIDING MACHINE.
APPLICATION FILED APR. 8, 1919.
1,333,408.
Patented Mar. 9, 1920.
7 SHEETS—SHEET 1.
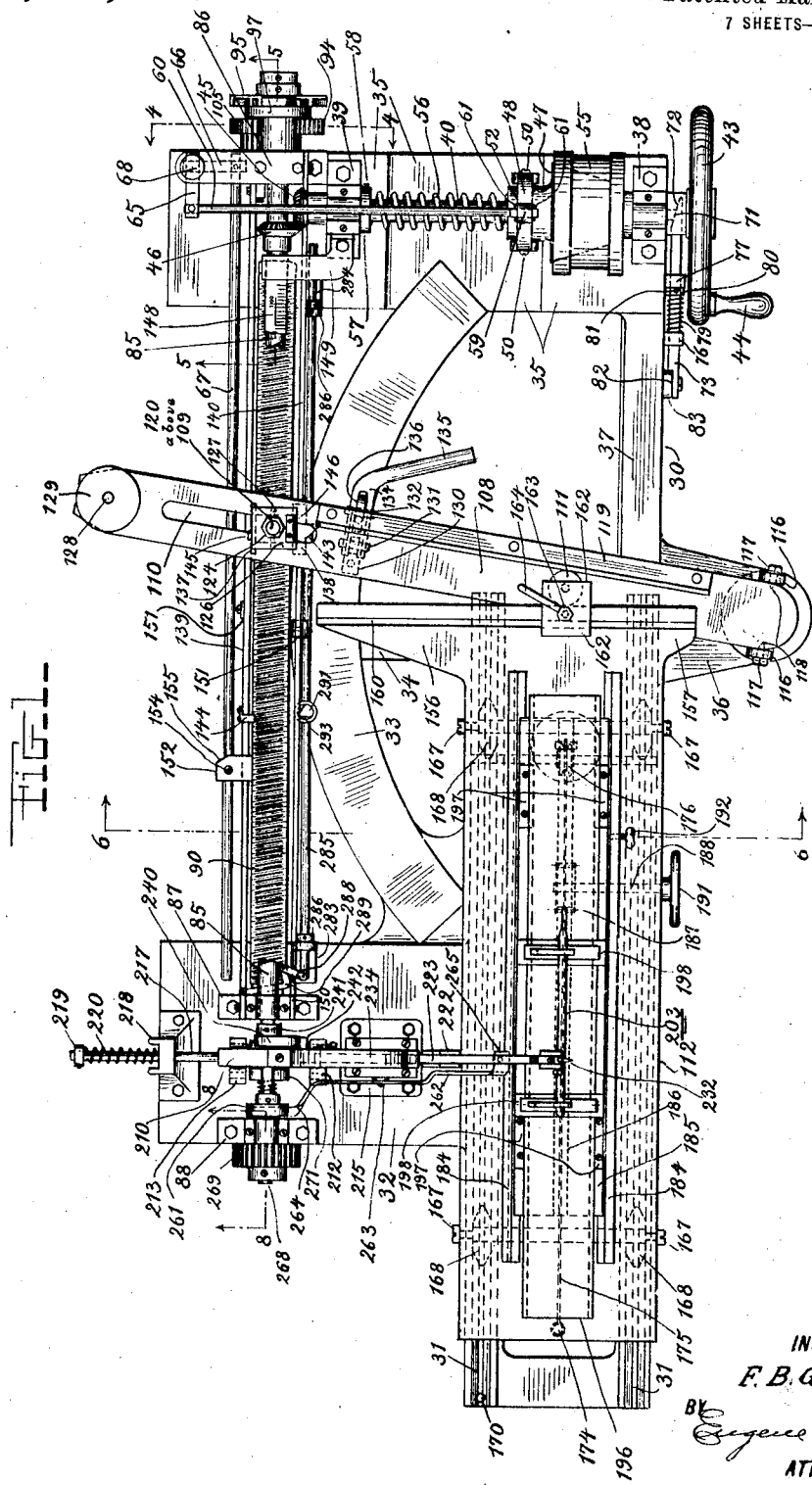
INVENTOR
F. B. GLOVER.
BY Eugene Bear
ATTORNEY

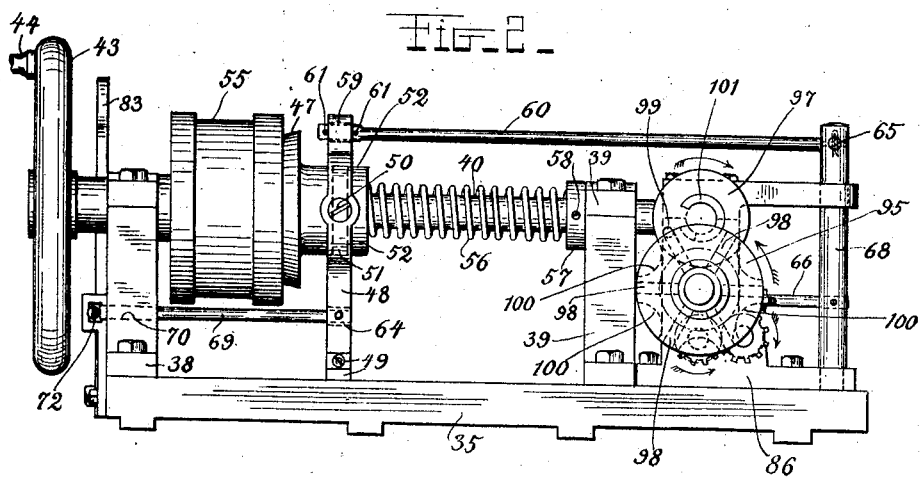

F. B. GLOVER.
DIVIDING MACHINE.
APPLICATION FILED APR. 8, 1919.

1,333,408.

Patented Mar. 9, 1920.
7 SHEETS—SHEET 3.

INVENTOR
F. B. GLOVER
BY
Eugene Pearl
ATTORNEY

F. B. GLOVER.
DIVIDING MACHINE.
APPLICATION FILED APR. 8, 1919.
1,333,408.
Patented Mar. 9, 1920.
7 SHEETS—SHEET 4.
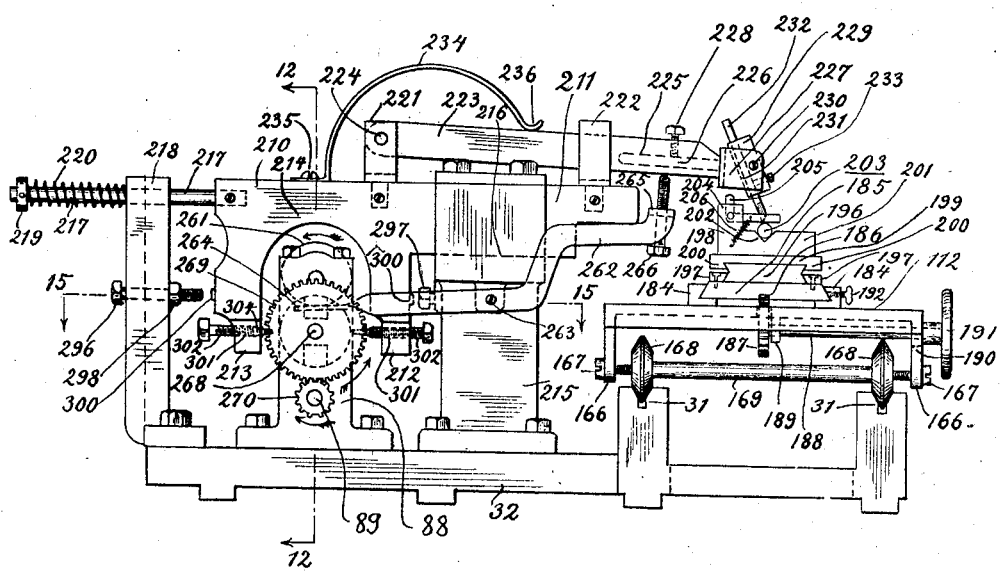
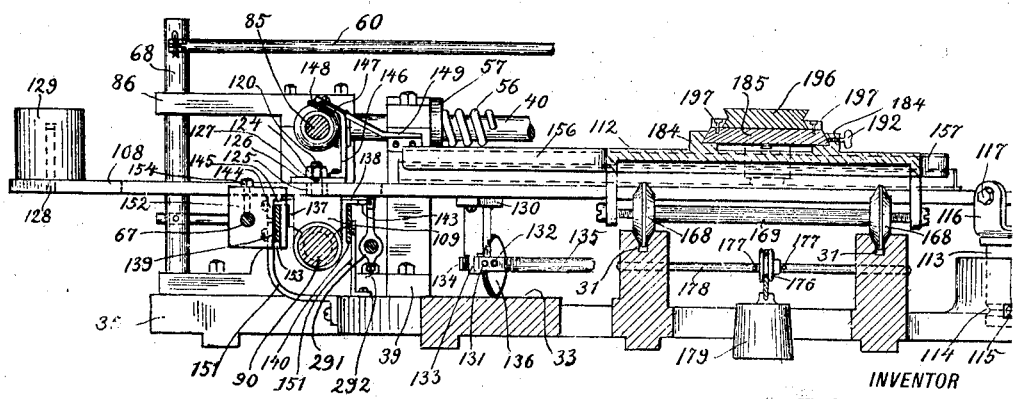
INVENTOR
F. B. GLOVER.
BY
ATTORNEY F. B. GLOVER.
DIVIDING MACHINE.
APPLICATION FILED APR. 8, 1919.
1,333,408.
Patented Mar. 9, 1920.
7 SHEETS—SHEET 5.
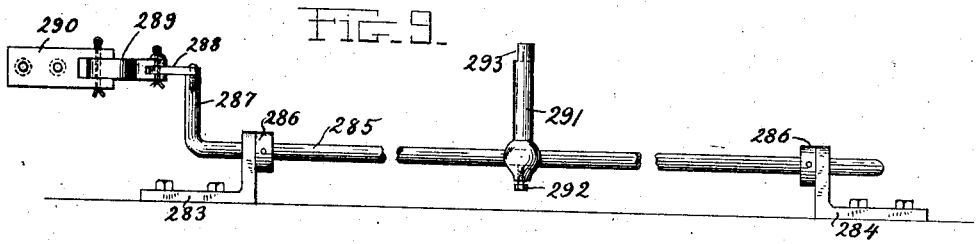
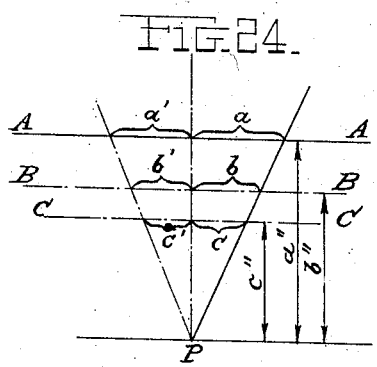
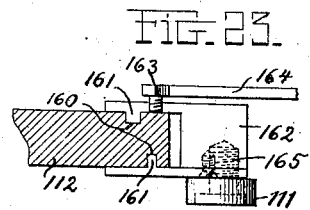
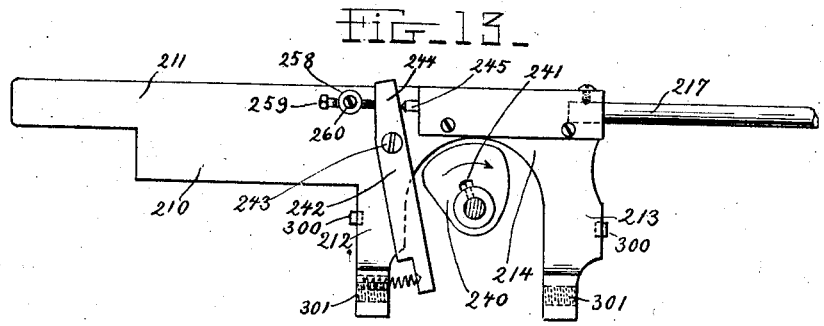
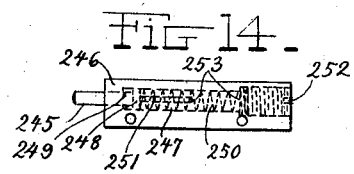
INVENTOR
F. B. GLOVER
BY
Eugene Pearl
ATTORNEY F. B. GLOVER.
DIVIDING MACHINE.
APPLICATION FILED APR. 8, 1919.
1,333,408.
Patented Mar. 9, 1920.
7 SHEETS—SHEET 6.
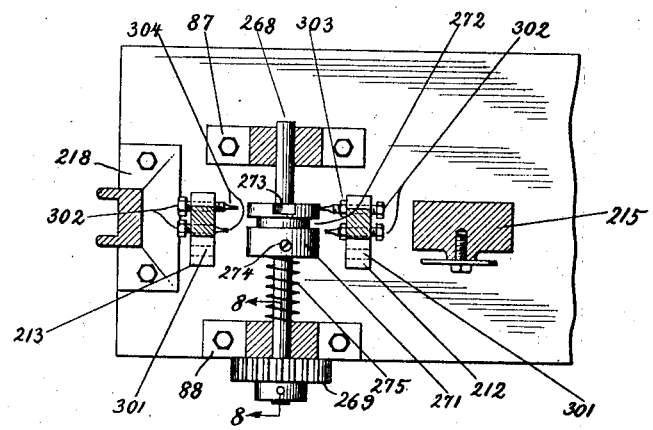
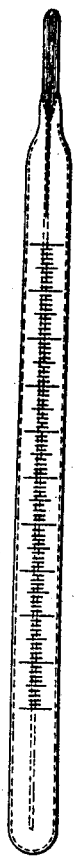
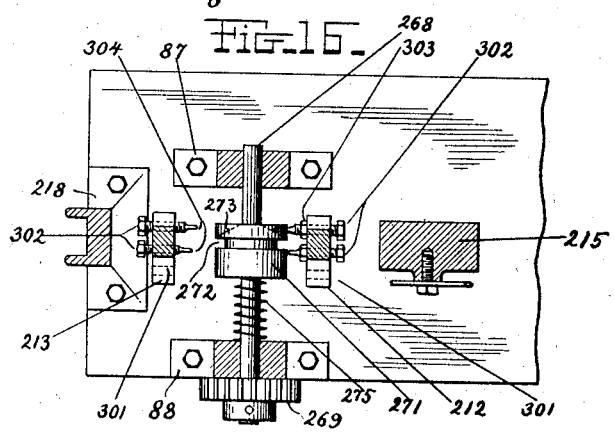
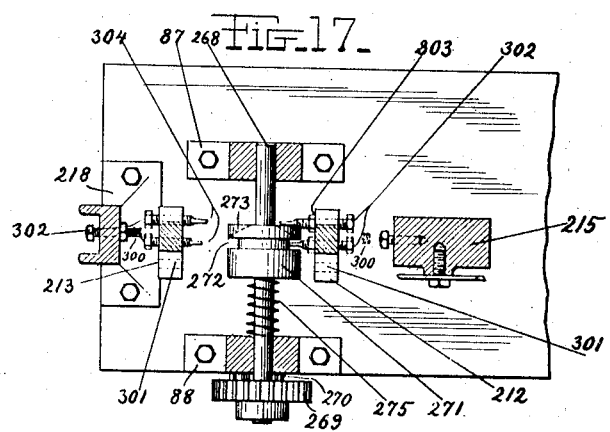
INVENTOR
F. B. GLOVER.
BY
ATTORNEY

F. B. GLOVER.
DIVIDING MACHINE.
APPLICATION FILED APR. 8, 1919.

1,333,408.

Patented Mar. 9, 1920.
7 SHEETS—SHEET 7.

INVENTOR
F. B. GLOVER
BY
ATTORNEY

UNITED STATES PATENT OFFICE.

FRANK B. GLOVER, OF BROOKLYN, NEW YORK.

DIVIDING-MACHINE.

1,333,408.	Specification of Letters Patent.	Patented Mar. 9, 1920.

Application filed April 8, 1919. Serial No. 288,621.

*To all whom it may concern:*

Be it known that I, FRANK B. GLOVER, a citizen of the United States, residing in Brooklyn, in the county of Kings and State of New York, have invented certain new and useful Improvements in Dividing-Machines, of which the following is a specification.

This invention relates to improvements in dividing machines, in which a stylus or engraving tool is moved reciprocatingly and intermittently across an object clamped or otherwise fastened on a support, which in turn is propelled at right angles to the stylus by equal steps and in the same rhythm.

One progressive step of the working piece followed by a continuous reciprocating motion of the stylus constitutes one cycle of the action, the movement of the stylus at the same time being so adapted that only during one-half of the reciprocation, that is during the forward or back motion, the stylus is brought to bear and operate upon the object.

This class of machines is mainly applicable to cases where an oblong object is to be graduated or provided with a scale, as for instance a thermometer tube, a burrette, eudiometer, hydrometer or a similar graduated container or flat articles of glass, metal, wood, ivory or other material. In the following description the graduating of chemical and clinical thermometers is chosen as an illustrating example, and the design of the machine is particularly adapted to this work, but it will be evident from the description that the same machine, if set and modified for such purposes, is equally applicable to all objects above alluded to.

One object of this invention is to provide an improved mechanism whereby a continuous rotary motion of a driving shaft induces a rhythmic intermittent motion of a second shaft, which initiates the propulsion of the work piece.

Another object is to provide a contrivance whereby the progressive steps directly produced by the intermittent motion of the second shaft are projected in any desired geometrical reduction upon the support directly holding and propelling the work piece.

A third object is the automatic positive disengagement of the driving pulley at any predetermined point of the operation.

A fourth object is to provide means whereby the lengths of division lines described or engraved by the stylus, as well as their periodical reappearance, can be regulated, modified and adapted to the various uses of the machine.

A fifth object is to furnish an attachment which will automatically cause one or more odd division marks to be produced at any predetermined part of the scale, if so desired.

A sixth object is to provide a contrivance which will transform the rotary motion of a driving shaft into reciprocating horizontal movement of the stylus, combined with suitable reciprocating vertical movement of the same.

A seventh object is the adjustability of the stylus in such manner that its depth, its working angle and position relative to the work piece may be altered without removing and reinserting the stylus.

These various objects are attained by the novel construction and combination of parts, devices and mechanisms described hereafter and shown in the accompanying drawings, in which:

Figure 1 is an assembled top plan view showing a dividing machine built in accordance with the invention and especially adapted for the graduation of clinical and chemical thermometer tubes.

Fig. 2 is an end elevation showing the driving shaft and its accessories.

Fig. 3 shows the locking device for the clutch movement.

Fig. 4 is a sectional view on line 4—4 of Fig. 1, showing the spur gearing which in connection with the Geneva gear shown in Fig. 2 completes the transmission of the movement from the auxiliary driving-shaft to the worm shaft.

Fig. 6 is a sectional view through the machine looking on line 6—6 of Fig. 1, toward the drive-end.

Fig. 7 is an elevational view of the operating end of the machine.

Fig. 8 is a sectional view taken on line 8—8 of Fig. 1 showing the spring latch device, which is used when chemical thermometers are to be graduated, and which periodically switches off the stop cylinder, indicated in Fig. 7 and shown more fully in Fig. 12.

Fig. 9 illustrates an attachment which performs a similar although exceptional and single function for the marking of the normal point on clinical thermometers.

Fig. 10 is a sectional view taken on line 10—10 of Fig. 8.

Fig. 11 is a top view of the spur gear shown in Fig. 8, with a part broken away on line 11—11 showing the inside latch of the grooved gear face.

Fig. 13 is a detail view of the skid carrying the operating arm and exhibiting the cushion attachment through which the propelling force of the cam is transferred to the skid.

Fig. 14 shows the spring plunger which coöperates with the skid in the case of chemical thermometer graduation, to impart additional yielding resilience to the cushion.

Figs. 15, 16, and 17 are sectional views taken on line 15—15 of Fig. 7 giving diagrammatical descriptions of the consecutive phases of the position the stop cylinder assumes and showing the corresponding motions of the limit stops in the case of chemical thermometer graduation.

Figure 18:
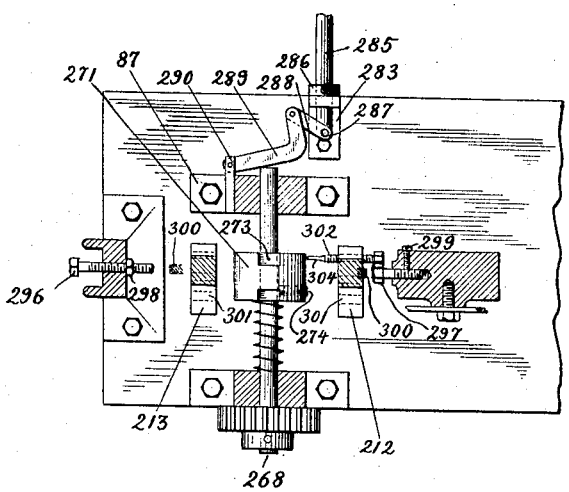
Figure 19:
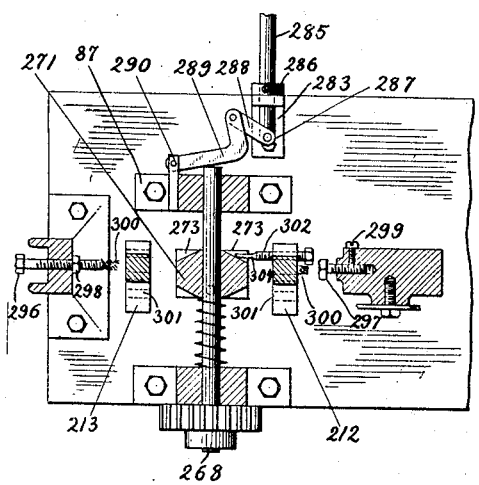
Figure 20:
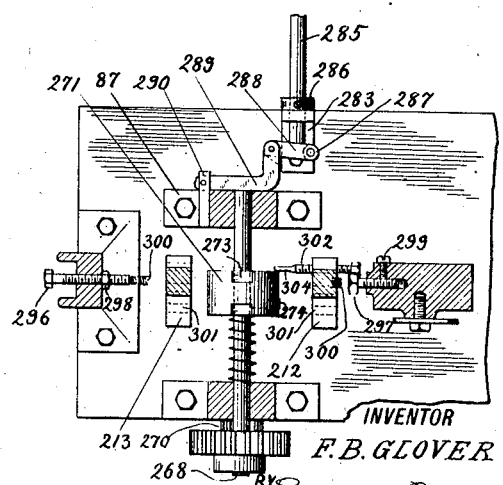

Figs. 18, 19 and 20 are sectional views taken on the same level 15—15 and showing modifications of the diagrams just mentioned in the case of clinical thermometers.

Fig. 21 shows the customary graduation of a chemical thermometer.

Figure 22:
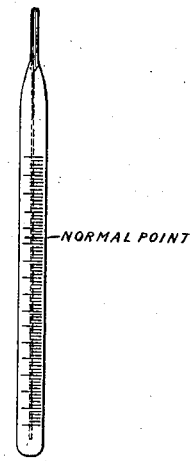

Fig. 22 shows the customary graduation of a clinical thermometer.

Fig. 23 is a front elevation of the jaw skid and roller guided by the grooves on the carriage platform, the latter being indicated in section.

Fig. 24 is a diagram illustrating the mathematical principle of the protractor device.

The base 30, Fig. 1, comprising as subdivisional and integral parts, the channeled rail tracks 31, the platform 32 for the operative mechanism, the protractor segment 33, extending from part 32 across the center brace 34 to a platform 35 that serves as support for the driving mechanism, and a bracket 36, located centrally to the segment 33 and adjoining the crossing point of the outer rail, respectively, its extension 37 with the aforesaid center brace 34, constitutes the framework of the machine.

On the platform 35 are mounted two pillow blocks 38 and 39 which journal a driving shaft 40. On the front extension of this shaft is keyed a handwheel 43, provided with a handle 44, and on the rear extension is a miter gear 45 matching with and driving another miter gear 46 which is keyed on the auxiliary driving shaft 85 to be referred to later.

The main driving shaft 40 is provided with a conical friction clutch comprising the usual features of such device, viz: the cone pulley 47 sliding on a straight key (not shown) of the driving shaft, and the fork 48, pivotally fulcrumed in a little foot bracket 49 (see Fig. 2), and guiding the cone pulley by means of two opposite screw plugs 50 which engage in an annular groove 51 of the cone pulley hub 52.

The cone pulley 47 is adapted to fit into the hollow conical cavity of the loose, belt-driven pulley 55 and is normally pressed into it by the compression spring 56 extending between the hub 52 of the cone pulley and a collar 57 fastened by a set screw 58 to the driving shaft 40.

The fork 48 itself, forming one solid annular piece and surrounding the hub 52 with a suitable clearance, is provided with a perforated top lug 59 in which rests the extreme end of a horizontal rod 60, held loosely in position by means of two split pins 61. The other extremity of rod 60 is pivotally engaged with a lever arm 65 (see Fig. 1).

This arm, in connection with another lever arm 66, similarly attached to another rod 67, and the turnstile post 68 in which these arms are rigidly fastened at right angles to each other, forms a bell crank mechanism acting in such a way that when the rod 67 is pulled, the rod 60 will also pull out and disengage the cone of the friction clutch against the tension of the coiled compression spring 56.

On its stem the fork 48, (see Fig. 2) is provided with a slot 64 in which one end of a rod 69 is pivoted which protrudes with its other end through an aperture 70 in the pillow block 38. The extremity of it is beveled off as shown at 71 in Fig. 1, in such manner that it matches with another beveled surface 72, which is formed on the top of a round latch bar 73, guided by the two bearings 76 and 77 forming part of a bracket 78, which in turn is attached to the base plate 30. (See Fig. 3.)

The resilience of the latch bar is effected by a compression coil spring 79, extended on the bar between the bearing 76 and a collar 80, fixed on the bar by a through pin or set screw 81, as shown in Fig. 3. The back end of the latch bar is chamfered off to form a flat bearing 82 (see Fig. 1), which is linked to a single arm lever 83, shaped as a handle and fulcrumed at 84 on the front edge of the base plate 30 (see Fig. 3).

The action of this spring latch device will now be apparent. When the clutch is automatically thrown out, as will be explained later, and the beveled end 71 of the rod 69 recedes sufficiently into the aperture 70, the spring latch bar 73 presses its beveled tip across the tip end of the bar 69 and locks the clutch in its disengaged position. When the cause that has effected the throw out of the clutch is removed and the clutch is ready to spring back into frictional contact with the driving pulley, it can move back only after the hand lever 83 is manually moved back, thereby releasing the beveled tip 71.

Figure 12:
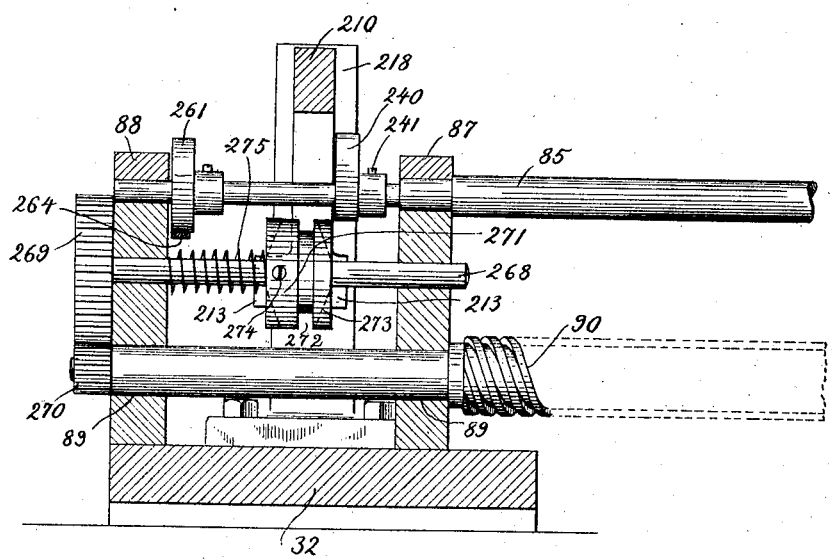
Fig. 12 is a sectional view taken on line 12—12 of Fig. 7, illustrating the cam device of the auxiliary driving shaft which induces the reciprocating movement of the operating arm in horizontal and vertical directions.
Figure 5:
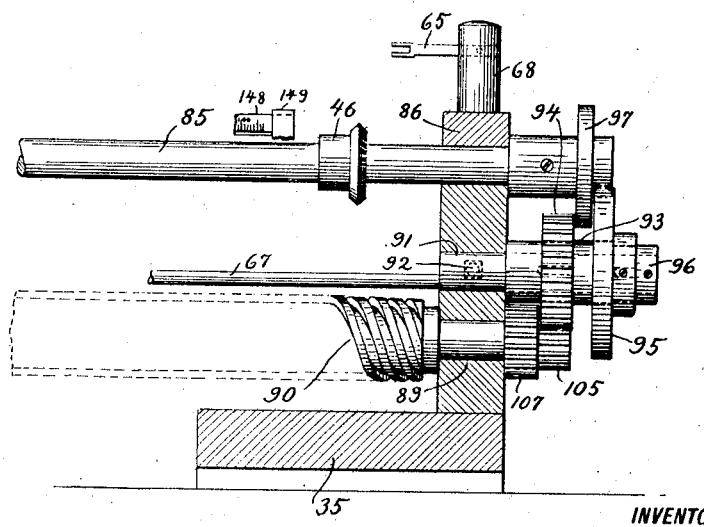
Fig. 5 is another vertical sectional view through this transmission gearing taken on line 5—5 of Fig. 1.

The auxiliary driving shaft 85, placed at right angles to the main shaft 40, and driven by the pair of miter gears 45 and 46 as mentioned before, is supported on the driving end of the machine by a pillow block 86 and on the operating end by two other pillow blocks 87 and 88. These three pillow blocks are also provided near their base with bearings 89, in alinement with each other, in which turns a shaft with a triple threaded worm 90, formed of one solid piece. See Figs. 5 and 12.

Between the upper and the lower bearing on the pillow block 86 there is a stud 91, (Fig. 5) securely held by a set screw 92 in the frame of the pillow blocks and extending outward. On this stud turns a sleeve 93, shown partly dotted in Fig. 5, on which are key seated and set screwed a spur gear 94 and the Geneva gear 95. On the end of the stud is fastened a collar 96 to limit the play of the sleeve upon the stud. In coöperation with the Geneva gear is the cam wheel 97, set screwed or throughpinned on the auxiliary driving shaft 85.

The Geneva gearing, shown in Fig. 2, is of a common type. The back of the Geneva gear 95 is provided with six centripetal grooves 98, of rectangular section with which the driving peg 99 of the cam wheel successively engages, alternating with six segmental incavations 100 through which the cylindrical escapement 101 glides during the dead phases of the movement. In this way each continuous revolution of the cam wheel causes the Geneva gear to make a turn of 60 degrees while the peg engages with a groove, the motion lasting about one-third of each revolution of the driving shaft. During the other two-thirds the Geneva gear remains stationary.

There being known and in technical usage quite a number of similar intermittent gear movements it is understood that the construction is not confined to this peculiar design. Likewise the number of driving channels and therewith the number of intermissions can be varied to suit the purposes of the machine.

The spur gear 94, coupled to the Geneva gear, drives a smaller spur gear 105 of a wider face at a ratio of 2 to 1. The latter turns freely on a fixed pin 106 (see Fig. 4) and transfers the motion to a spur gear 107 of like pitch diameter keyed on the worm shaft 90. Compare Fig. 5.

If, therefore, the cam wheel on the auxiliary driving shaft makes three revolutions, the Geneva gear turns through a semi-circle and the worm makes one revolution but in three stages, each period of action followed by an interval of rest about twice as long.

The worm being triple-threaded as aforesaid and having for instance a pitch of one-third of an inch, it follows that a nut propelled by this worm would travel one-ninth of an inch at each impulse of the cam or just the distance between the two adjacent threads.

To obtain the second object stated in the preamble, viz: to transmit these progressive steps in any desired geometrical reduction to the track of action whereon the work piece is manipulated, a planimetric theorem is made use of which may be briefly stated thus.

"If a number of straight lines radially diverging from one common point or 'pole' intersect with two parallels, all corresponding sections cut off on these parallels by the pole rays give the same proportion, which is equal to the quotient of the pole distances of the respective parallels." See Fig. 24.

Thus $$a : b = a' : b' = a'' : b''$$

and $$a : c = a' : c' = a'' : c''.$$

In the mechanical application the pole P is represented by the axis of the protractor 108 swinging around this point; the upper parellel A—A corresponds to the line along which the worm cap 109, situated directly below 120, Fig. 1, and shown in Fig. 6, travels over the worm, the cap being confined inside the slot 110 of the protractor and the other parallels B—B or C—C are represented by the path which the center of the roller 111 describes, the same being rigidly, though adjustably fixed in its position relative to the carriage 112, that propels the work.

Going more into details of the device thus outlined it will be seen that the crosshead 113, Fig. 6, is held in place by two screws 115, opposite each other, whose tips run in an annular groove 114 on the shank of the cross head. Each of the two fork shaped arms 116 carries a pivot screw 117 which engages in a little socket 118, Fig. 1 on opposite sides of the fulcrum end of the protractor arm 108.

On the upper surface, along the edge of this arm, is fastened an angle rail 119 to guide and propel the carriage roller 111.

The worm cap 109, Fig. 6, surrounding and closely fitting the upper portion of the worm threads, has on its top a round shank 120, threaded on the end to receive the lock nut 124 which keeps in place and holds down the unthreaded guide nut 125, shaped to fit and slide inside the slot 110, and the square washer 126, additionally fixed by a through pin 127 and forming a guide plate over the slot 110.

The overhanging end of the protractor arm is provided with an upright stud 128 which carries a weight 129 to increase the bearing friction of the worm cap on the worm.

At right angles to the axis of the protractor arm, and located above the surface of the protractor segment 33, is a T shaped bracket 130 screwed with the cross-part to the underside of the arm and hinged on the pivot 131 with its reduced lower end 133 within the prong tips of a forked lever 134. Toward the handle 135 this fork supports another cross pivot 132 which forms the axle of a little roller 136.

For convenience of manipulation the handle is bent aside at an obtuse angle, as shown on Fig. 1, but this feature is immaterial. The whole device forms a double-armed lever which, when swung by means of the handle about the roller axle, lifts the protractor arm and the worm cap affixed thereto and allows it to be wheeled over to any desired point of the segment 33.

The worm cap when thus lifted off the worm has to be guided in rectilinear motion over the worm, which is accomplished by two angular guide brackets 137 and 138, (Figs. 1 and 6) attached respectively to either side of the cap, parallel to the worm axis. These brackets slide with sufficient clearance between and over the two flat guide bars 139 and 140, the latter being attached at their respective ends to the sides of the pillow blocks 86 and 87, as 150 indicates in one instance. See Fig. 1.

The bracket 138 has on its top extension a toothshaped beveled catch 143, whose importance for the marking of the normal point on clinical thermometers will be described later, and the guide bar 139 is provided with a little bracket 144 overtopping the extension 145 of the bracket 137 when the latter approaches and comes underneath the bracket 144, thereby safe-guarding the whole protractor arm against being lifted off the worm, as will be referred to again in the same context. Guide bars 139 and 140 may be steadied against buckling by two auxiliary brackets 151.

On top of the square washer 126 is fastened a bracket 146, shown broken off in Fig. 1, and sidewise in Fig. 6, whose upright and obtusely bent over portion ends in an indicator or pointer 147, running over an engraved metal scale 148, attached by a flat bar-support 149 to the pillow block 39 and in a similar way to the pillow block 87. In Fig. 1 the latter attachment is omitted, the scale being shown broken away, but its application on the inner upright side of pillow block 87 right above the attachment 150 of the guide bar 140 can easily be inferred.

This scale is graduated by divisions equal and corresponding to the distances between adjacent threads of the worm 90, and in this instance, (the graduations of thermometers) prominently marked in sections of 10 and subsections of 5, the whole range comprising not less than 100 units counting to the right as well as to the left from a zero point located directly over the axis of the protractor arm, standing at right angles to the worm.

The rod 67, running parallel to the worm track, and, as before mentioned, attached to the lever arm 66, will, when pulled disengage the friction clutch by revolving the turnstile 68 with its lever connection to the clutch fork. It is supported on its free end by a traversing slide 152. This slide, by means of a slot 153, Fig. 6, rides on and is adjustably supported by the guide bar 139 and is provided with a set screw 154 by which it can be fixed to the rod 67 at any selected point, and at the outer corner 155, Fig. 1, facing the driving end of the machine, it is beveled off to be engaged by the side of the protractor arm wherever the same in its progression may strike it. When this happens the slide and the rod 67 will be pushed forward and in turn will automatically throw out the clutch, as aforesaid.

The main body of the carriage 112 (see Fig. 1) consists of an oblong and rectangular plate, one end of which, adjacent to the protractor, is elongated over its corners by toe-and heel-shaped extensions 156 and 157 respectively. Throughout its length on top and bottom run two grooves 160 of square section in which are guided and interlocked two corresponding ledges 161 formed on the inner contact surfaces of the jaw skid 162 (see Fig. 23). This skid may be made of one or more parts as convenient. A set screw 163 with a handle, 164 permanently attached to its hexagon head, is provided in the upper jaw by means of which the jaw-skid may be fixed at any desired point along the groove 160, the use of the handle being sufficient for ordinary manipulation, while the hexagon allows the application of a more powerful wrench.

On its bottom toward the outside edge the skid 162 has a stud 165 screwed into it on which turns the aforesaid contact roller 111.

The carriage plate proper (see Figs. 6 and 7) is provided on its side edges with two pairs of lugs 166 extending downward and opposing each other, in which pivot screws 167 can be adjusted so that the naves of four wheels 168, firmly attached to or integral with their respective axles 169 may turn freely on them. The wheels are shaped as double-cone pulleys so that their rims may conform with the V-shaped grooves of the tracks 31 on the base 30. On the end of one groove a stop 170 is provided to limit the run of the carriage.

The free end of the carriage is provided at its center with a short peg 174 extending downward, to fasten a cord or chain 175 which then runs over a sheave 176, turning between two split pins 177 on a rod 178, Fig. 6, the latter being fixed by its extreme ends in the bases of the tracks 31. The free end of the cord or chain is fastened to a weight 179 which will pull the carriage back, following the protractor arm, whenever the same is moved into its initial position.

On the bed of the carriage, a slide is provided consisting of two recessed runways 184 in which a flat bevel-sided plate 185 can slide. The bottom of this plate is furnished along its center with a rack 186 with which a spur gear 187 engages, the gear being keyed on a shaft 188 which itself is journaled in two small lugs 189 and 190 forming part of the bed plate. A hand wheel 191, fixed on the outer extension of this shaft, affords the means to turn the shaft with the spur gear and regulate thereby the position of the bevel plate 185, see Figs. 1 and 7. A thumb screw 192, embedded in the front runway serves to lock the bevel plate when in any desired position.

On top of this plate rests another plate 196 protruding both ways over the plate 185 and guided by four clamps 197, which are screwed on the outer edges of the plate 185 and fit into the V-grooved sides of the plate 196. This plate serves as the final support of the two work-holders 198, adjustably secured with their base plates 199 on the upper halves of the V-grooved sides, to which their shape conforms, as their overlapping ends 200 indicate.

The remaining portion of their body consists of a knee-shaped support of rectangular section, the lower horizontal members 201 of which rest on the baseplate and are provided with a triangular notch 202 for supporting the thermometer tubes 203 to be worked on, while the vertical members 204 are slotted on their upper ends to receive a bell-crank lever 205, pivotally hinged in these slots. The horizontal ends of these bell-cranks project over the thermometer and are normally presesd down upon them by little compression coil springs 206, connecting the lever arms with their supports. In this way the tubes are securely clamped in proper horizontal working position.

The construction of these work-holders however, is not confined to the above description and may vary considerably.

The manipulation of the dividing machine, as far as the use of the parts hitherto described is concerned, will become evident from the following:

The scale of clinical thermometers usually ranges at most from about 90 to 110 degrees Fahrenheit. The two temperatures at which the glass tubes partly filled with mercury were tested before graduating are, say, at 98 and 108 degrees, the corresponding levels of the mercury being marked by a very fine scratch in the glass, made visible by blacking. This length, which may vary in every instance, has now to be divided and marked by the machine into 50 equal parts.

Preparatory the tubes are dipped into a wax or paraffin solution, covering the glass with a thin transparent film.

After setting the protractor normally, i. e. at right angles to the worm-axis so that the pointer 147 stands at zero, and adjusting the slide 185 by means of the rack and spur gear, and also the V-grooved plate 196 to an approximately suitable position, the thermometer is clamped in the work holders 198 which are normally kept at the proper distance apart.

Now, the exact adjustment is made for one of the test points so that the engraving stylus, shown best in Fig. 7 coincides with it. Then the protractor arm is moved to the right or left, according as the right or left test point is originally chosen, until the pointer covers the "50" mark on the scale whereupon the set screw 163 of the jaw skid 162 is loosened by turning the handle 164 and the position of the skid is altered until the other test point on the thermometer tube coincides with the edge of the stylus. After each adjustment the parts are rigidly fixed in position by tightening the corresponding set screws.

The marking of the divisions is done by the edge of the stylus scratching a long or short line into the wax coating, exposing the glass surface, as will be presently described, after which the marked tubes may be treated with hydrofluoric acid which etches the bared lines into the glass. It will now also be evident why a triple thread is chosen for the worm.

The worm making a turn of 120 degrees at every impulse of the Geneva wheel, and the scale 148, having 100 divisions each way from the zero point, and conforming with the advance of the worm cap and indicator or one-ninth of an inch at every such impulse (the worm having a pitch of one third of an inch) it follows that with a single, double or quadruple thread, the movement of the worm cap and indicator would be the same as with the triple thread but the setting to the second test point could only be made to such numbers as were multiples of 3 counting from zero, namely 48 or 51 or the like, whereas with a triple thread all scale marks and thread distances tally, and the second setting can be made at any number, whether multiple of 3 or not. An intermittent movement with different phases however, or a different application of the machine would also imply another choice of worm-threading.

Having thus described those parts of the machine whose function is restricted to the initiation, transmission and termination of working power in the first place and to the properly regulated locomotion of the work piece in the second place, it remains to consider the mechanism that accomplishes the intended transformation or operations upon the work-piece, that is:—the engraving stylus and all devices functioning in the appropriate guidance of the same.

The principal part of this mechanism is the skid 210, Fig. 7, an oblong sliding beam with a rear extension resembling a reversed U or an arch. In detail it consists of the slide bar 211, the front leg 212, the rear leg 213 and the bow 214, connecting the legs and forming a continuation of the slide bar.

The slide bar is supported by the cradle 215, a rectangular stand bolted upon the support or platform 32 of the base and provided on top with a well fitting, capped and lubricated slot 216 for the slide bar. Into the free end of the bow 214 is fastened the tail slide 217, a rod which is supported and guided by the rail post 218 a narrow upright stand, also bolted upon the platform 32. The protruding end of the tail slide on which the collar 219 is pinned is made resilient lengthwise by a compressive coil 220 which, when unrestrained, pulls the tail-slide and the skid back toward the rear of the machine and thereby exerts the real stress which draws the stylus 232, supported by the skid, across the surface of the work piece.

On top of the skid are two forks 221 and 222 embedded with their shanks and set-screwed in sockets, the fork 221 in the rear, serves as a hinge for the operating arm 223, which turns upon a stud 224 connecting the two prongs of the fork.

The other fork 222 in the front, located near the tip end of the slide bar, serves as a guide simply.

The operating arm 223 has on its free end a long socket 225 drilled axially into it, in which the shank 226 of a fork 227 is adjustably held by the set screw 228. The fork end serves as support for rectangular sleeve 229 hung upon the stud 230 and held at an oblique angle by the slanting bottom 231 of the fork slot. This sleeve surrounds the stylus 232, it being a knife-like engraving tool of the professional make and adjustably held in place and at proper height by a set screw 233.

A flat steel spring 234 in the form of a bow is screwed at one end 235 to the top of the skid and presses down the operating arm 223 with the other end 236.

On the auxiliary driving shaft 85, between the pillow block 87 and the skid 210, but in close proximity to the latter, is provided a cam 240, (Figs. 1, 12, and 13) resembling a quadrant disk with rounded off corners whose extended hub is securely set-screwed on the shaft, as indicated at 241. On every revolution, this cam, with its protruding circular face, engages the lower and longer member 242 of a vertical double-arm straight lever, fulcrumed on a stud 243, which is fastened to the side of the skid over the front leg 212. The upper member 244 of this lever bears against the rounded outside tip of a plunger pin 245. The plunger device consists of an oblong rectangular casing 246, fastened lengthwise to the bow 214 of the skid, and bored out as at 247 to receive in series the plunger pin 245, provided with a shoulder 248 adapted to bear against an annular ledge 249 in the boring, a strong coil spring 250 that surrounds the reduced inner end of the pin 251 up the shoulder, and a headless slotted screw 252, which is threaded into the rear end of the boring and serves to adjust and increase the tension of the coil spring, sufficient clearance being provided between the inside end of the pin and the tip of the screw (see numeral 253).

On the other side of the upper member 244, opposite to the plunger pin, a stop is provided, consisting of a stud 258 tapped into the slide bar 211 having its head threaded diametrically and horizontally for a stop screw 259 which in turn can be fixed in its adjusted position by a set screw 260, tapped axially into the head.

This stop, in connection with the plunger pin, serves to obtain an eventual declination of the lever between them from the vertical, thereby regulating the clearance between the unrestrained position of the skid attachment and the disengaged cam described above. The whole arrangement acts like a cushion of moderate resilience the strength of the spring being so chosen and regulated that it will not preclude or slow up the sliding of the skid when the cam acts upon the lever 242, but will yield as soon as the free play of the skid is arrested by any of the limit stops to be mentioned later.

Beyond the skid and close to the pillow block 88 is provided another cam 261, (Figs.

7 and 12) similar to 240 but set at about right angles to the former and comprising a semi-circle instead of a quadrant. This cam is also set-screwed on the shaft and when the cam 240 starts to push the skid farthest to the front, the semi-circle of the cam 261 has reached its lowest position. Simultaneously it presses down a latch 262 consisting of a double-arm lever hinged about its middle to a lug 263 on the cradle 215 and bent at different places in such manner that it reached from a point beneath the cam 261 to another point below the operating lever 223, its ends being shaped as horizontal lips 264 and 265, the latter carrying an adjusting screw 266, supporting the protruding end of the operating arm.

It is obvious then that the cam 261 causes an up-and-down motion of the stylus in continuous and interrelated rotation with the forward and back-motion of the same as effected by the cam 240.

The pillow blocks 87 and 88 are each provided with a third bearing between those for the auxiliary driving shaft and those of the worm shaft, in which the drum shaft 268 turns. See Figs. 12 and 7. This shaft is driven from the outside by a set-screwed spur gear 269 in mesh with a fixed pinion 270 on the worm shaft at such ratio that the spur gear will have completed one revolution after ten intermittent impulses of the pinion, which would answer the presupposed purpose of the machine but would be altered to suit other conditions. As three impulses complete a turn of the worm it is evident that a gear ratio of one to three and one third is required, that is, if the pinion has 12 teeth the spur gear has to have 40.

The shaft 268 carries a cylinder or drum 271 facing the descending legs 212 and 213 of the skid. Near the middle this drum is provided with a rectangular groove 272 (shown in Figs. 15 to 17 but omitted in Figs. 18 to 20 as being not functionary in the latter case), its depth being adapted to suit the function described hereafter.

On the side (rear or front or both as circumstances require) the drum is notched out diagonally with two recesses 273, slanting outward from the circumference to the center and opposing each other. Two opposite set screws 274 having their heads flush with the cylindrical surface fasten the drum securely on the shaft.

Between the drum and the outside bearing is expanded a coil spring 275 tending to keep the drum in direct opposition to the legs as described. The inner face of the spur gear 269, adjacent to the pillow block, is dished out and near the outer rim is provided with a little nose 276 beveled off on both sides (see Figs. 10 and 11). At the same distance from the center of the shaft the pillow block is equipped with a pin 277 threaded through its wall, projecting into the dished recess so as to interfere with the nose 276 at every turn of the spur gear and forcing it outward, thereby side-stepping the shaft with the drum at every tenth impulse of the worm as shown. The pin is removable from the inside of the bearing and secured there by a lock nut 278.

On the inner edges of the platforms 32 and 35 are mounted two small brackets 283 and 284 which form journals for a tripping shaft 285, prevented from moving lengthwise by two set screw collars 286 (Figs. 1 and 9).

At the operating end where it projects beyond the journal 283, this shaft 285 is bent upward at a right angle and on its tip end 287 is linked a short arm 288 which connects it with a bell-crank lever 289. The longer arm of this bell-crank passes over the tip end of the drum shaft 268, the same protruding a short distance beyond its own journal, and is linked on its rear tip into the prongs of a little forked bracket 290, fastened on the rear side of pillow block 87 (see also Figs. 18 to 20).

The distance that the drum shaft protrudes beyond the journal, touching the side of the bell crank must correspond to the depth of recess in the gear 269. On the tripping shaft 285 is adjustably mounted an upright tripper arm 291 shaped like a round bar with the lower end upset and perforated so that it can slide and be adjusted on the shaft 285. From the underside it can be fastened to the shaft by a set screw 292 (Figs. 6 and 9). The free tip end of this tripper arm is chamfered off in such a way that when the tooth-shaped catch 143, on the worm cap referred to before, strikes it from the right side, their bevels conform and effect an easy tilting over of the tripper arm, the little bracket 144 meanwhile safe-guarding the protractor arm against being lifted off the worm as was explained in the same context. See Fig. 1.

On the left side, however, the chamfer is cut at a right angle to the worm-axis, (see 293) as well as the back of the beveled tooth 143, so as to insure a prompt and instantaneous release of the tripper.

This tripper device is used in the case of graduating clinical thermometers only and is dispensed with in the case of chemical thermometers by loosening the set screw 292 and dropping the tripper out of action or by disconnecting at 288. In this case it is superseded by the pin and nose device (276 and 277) described before. The employment of either one of these devices precludes that of the other.

Fig. 22 shows the scale of clinical thermometers. It will be observed that there is an odd long division mark, the so-called normal point, viz: at $98\frac{3}{5}°$, which is produced by the use of this tripping device, setting the tripper so as to act when the pointer 147 just reaches the proper point on the scale. The tilting of the tripper actuates the bell-crank movement and temporarily forces the drum shaft outward, side stepping the drum thereby.

Finally the means by which the lengths of division marks are regulated and their periodicity is insured will now be considered.

Looking at Fig. 22, showing a clinical thermometer scale, it will be observed that all lines start from the same level on one side and the division lines are of two different lengths, every fifth line being a long one. In addition to this there is the normal point, an odd long line.

Fig. 21 shows the manner in which chemical thermometers are graduated. There are three different lengths of lines in symmetrical arrangement, starting with zero. Every tenth, twentieth, thirtieth, etc., division line is relatively long while every fifth, fifteenth, twenty-fifth, etc., sub-divisional mark is a line of medium length. All others are short and of uniform length.

To produce this regular variety, limit stops are used and they are of two different kinds; stationary and reciprocating. There are two stationary stops 296 and 297, the first consisting of a screw-bolt passing horizontally through the middle line of the tail post 218 and provided with a locknut 298 on the skid side, the second is tapped into the cradle and secured by a set screw 299. See Figs. 7 and 18 to 20.

Opposing them, the skid faces are provided with fiber dowels 300 let into them to check the stroke of these stops.

The descending legs 212 and 213 of the reciprocating skid are enlarged at the bottom and each provided with threaded holes 301 for three horizontal screw bolts 302 on each side of the stop drum 271. These screw bolts pass through them on a level with the axis of the drum, are adjustable and may be secured in position by a locknut 303. (Figs. 15 to 17). The tip ends are reduced and end in rounded points 304.

Not all of these accessories however are always in use.

Figs. 18, 19 and 20 illustrate their application for graduating clinical thermometers. Both stationary stops in this case are used, stop 297 for determining the level from which all lines start and stop 296 limiting the length of the longer lines. Only one reciprocating stop 302 is necessary, and this will limit the length of the short lines as Fig. 18 intimates. Fig. 19 shows the position of the drum and pins after the tracing of a long division mark and Fig. 20 the action that marks the normal point.

Figs. 15, 16 and 17 illustrate the application of these accessories for chemical thermometers.

The employment of the stationary stops can be dispensed with in this case by the use of the reciprocating center stops where only two lengths of lines are required, but will be necessary in connection with the middle groove on the drum when three lengths of lines are required.

The inner reciprocating stops, by striking upon the mantle of the drum upon either side, determine the length of the short line, see Fig. 15.

At every half turn of the drum, which would be after five impulses of the worm, the slanting slots stand facing the stops and allow them to enter the slots, until the center stops, which are set shorter, strike the cylindrical surface. This terminates the lines of medium lengths. (See Fig. 16).

At every full turn of the drum, corresponding to ten impulses of the worm, or three revolutions of the same plus an extra turn of 120 degrees, the pin 277 protruding into the recess of the spur gear strikes against the nose 276, forces out the gear and sidesteps the drum. Then the inner stops have full leeway, the center stops are facing the groove in the drum, and enter it until checked by the stationary stops and thus terminates the length of the longest division lines (see Fig. 17).

The third hole in the legs of the skid affords the possibility of arranging other combinations not required for the immediate purpose of the machine.

The foregoing description is believed sufficiently clear to enable those versed in the art to make and use the machine indicated, but it is to be understood that the description is largely illustrative and explanatory rather than restrictive, as it will be obvious that many minor changes may be made without departing from the general scope and spirit of the disclosure.

Having thus described my invention, what I claim as new and desire to secure by Letters Patent, is:—

1. In a dividing machine, a drive comprising in combination, a shaft, means for manually rotating said shaft, a friction clutch pulley loosely mounted thereon, a cone keyed to said shaft engageable with said clutch pulley, a pivoted lever operably engaged with said cone, adjustable automatic means for disengaging said cone, said means becoming operative at the termination of the work operation, and means for locking said clutch when out of engagement.

2. In a dividing machine, a drive comprising in combination, a shaft, a belt driven friction clutch rotatable on said shaft, a cone engageable therewith, said cone being slidably keyed on said shaft, means for normally holding said cone in engagement, a fork for moving said cone, means for holding said fork when said cone is retracted, means for manually releasing said holding means, a rotatably mounted bell-crank, connections between one arm of said bell-crank and said fork whereby the latter may be moved, a rod engaged in the other arm of said bell-crank, and a stop adjustable on said rod, said stop making contact with a movable part of the mechanism at the end of its operation whereby said cone is automatically disengaged from said driving clutch pulley.

3. In a dividing machine, a supporting frame, a transverse shaft at one end, driving means therefor and means for automatically disengaging said driving means at the end of the work operation, an auxiliary shaft at a right angle to said driving shaft, geared connections between said shafts, a worm mounted below and parallel to said auxiliary shaft, a stud in said frame, a sleeve rotatable thereon, gear connections between said sleeve and said worm, a cam wheel fixed on said auxiliary shaft, and a Geneva gear on said sleeve driven by said cam wheel whereby intermittent rotary motion impulses are transmitted to said worm through said gearing.

4. In a dividing machine, the combination with a support frame, a worm rotatable therein and means for periodically actuating said worm, of a pivotally mounted protractor bar having a slot in its free end extending over said worm, a slide movable in the mentioned slot, a block having threads engageable with said worm, means for guiding said block parallel to the axis of said worm, a stem on said block rotatable in said slide, means for holding said stem in engagement, means for raising said block out of contact with said worm, and adjustable means actuated by said protractor bar for stopping the machine.

5. In a dividing machine, the combination with a supporting frame, a worm rotatable longitudinally therein, and means for periodically actuating said worm, of a fork having a stem rotatable on a vertical axis in said frame, a protractor bar pivoted between the arms of said fork, a weight at the opposite end of said bar, a central longitudinal slot near the free end of said bar, a slide movable in said slot, a block having threads engageable with said worm, a stem formed with said block rotatably engaged in said slide, a pair of bars fixed in said frame parallel and contiguous to said worm for guiding said block, and means for manually raising said protractor bar so as to release said block from said worm.

6. In a dividing machine, the combination with a supporting frame, a worm rotatably mounted therein, and means for periodically rotating said worm, of a protractor bar extending over said worm, universal joint connections at one end of said bar with said frame, a half nut engageable with said worm, guide means at the sides of said nut, said means extending parallel the entire length of said worm, operative connections between said nut and said bar whereby the bar is actuated by the rotation of said worm, a lever hingedly engaged on said bar, a roller journaled in said lever, a segmental track plate on said frame on which said roller rests, and a handle on said lever whereby said bar and nut may be raised.

7. In a dividing machine, the combination with a supporting frame, a worm mounted therein, a scale secured on said frame parallel to said worm and means for periodically actuating said worm, of a protractor bar pivotally and hingedly mounted at one end extending transversely over said worm, a slide operatively engaged with said bar, a half nut pivotally carried by said slide engageable with said worm, and a pointer on said slide traversing said scale.

8. In a dividing machine, the combination with a supporting frame, and a worm periodically rotatable therein, of a protractor bar pivoted at one end to said frame, means for raising said bar, an adjustable support for said bar, operative connections between said bar and said worm, a work-table slidable on said frame parallel to said worm, a roller carried by said table, a longitudinal ledge on said bar contactable by said roller, and means for holding said roller in contact therewith.

9. In a dividing machine, the combination with a supporting frame, a protractor bar and means for intermittently actuating said bar, of a work-table movable longitudinally on said frame, lateral extensions at the inner end of said table, said table and extensions containing transverse slots, a skid adjustably engageable in the slots, means for clamping said skid in adjustment, a roller mounted on a vertical axis in said skid, a raised longitudinal ledge on said protractor bar contactable with said roller, and means for normally maintaining said roller in engagement with said ledge.

10. In a dividing machine, the combination with a supporting frame, of a pair of raised longitudinal shears containing parallel V grooves, double coned rollers rigidly engaged in pairs suited to the grooves, a support table, means for adjustably securing said table to said rollers, a slide movable on said table, means for manually actuating said slide, means for clamping said slide in adjustment, a pair of work supports on said slide, and means for automatically clamping work parts on said supports.

11. In a dividing machine, the combination with a supporting frame, of a work table movable longitudinally on said frame, a protractor bar pivoted at one end and extending across said frame, means for periodically and uniformly actuating said bar, a roller carried by said table, means for holding said roller in contact with said bar, and means for adjusting the point of contact between said roller and said bar whereby the movement transmitted to said table may be increased or diminished.

12. In a dividing machine, the combination with a base, a work table movable thereon, a protractor bar adjustably engageable with said table, and means for intermittently actuating said bar, of a work holder on said table, a stylus, means for actuating said stylus intermittently over said table and means for automatically varying the length of the stroke of said stylus in a predeterminable relation to the movement of said table.

13. In a dividing machine, the combination with a supporting frame, a work holding table movable thereon, and means for progressively actuating said table intermittently in equal adjustable stages, of a stylus movable over said table during the intermissions between its movements, means for actuating said stylus reciprocatively, means for raising said stylus after its return stroke, and means for automatically varying the length of the strokes of said stylus.

14. In a dividing machine, the combination with a supporting frame, a work holding table movable thereon, and means for actuating said table intermittently by equal adjustable stages, of a stylus movable transversely over said table, means for actuating said stylus reciprocatively during the intermissions of the table movement, means for causing said stylus to begin all marks in a straight line parallel to the work, means for extending certain of the marks to definite distances beyond the normal and means for the interposition of one or more abnormally long marks.

15. In a dividing machine, the combination with a supporting frame, a work holding table and means for intermittently moving said table, of a beam slidable transversely to said table, a bar pivoted on said beam, a stylus carried by said bar, means for normally pressing said bar downward toward said table, a lever for raising said bar, a cam adapted to move said beam forward, a spring opposed to said cam, a second cam for actuating said raising lever, and means for rotating said cams in proper sequence to the movements of said work table.

16. In a dividing machine, a stylus carrying head comprising in combination, a guide bracket, a beam slidable therein, a rear support for said beam, a bar pivoted on said beam extending opposite to said support, means for pressing said bar downward, a stylus adjustably mounted in the front of said bar, a bent lever pivoted on said bracket, one end of said lever being in adjustable contact with said bar whereby the bar may be raised, a cam timed to contact with the opposite end of said lever after the return stroke of said stylus, a pair of lugs formed with said beam, a second cam rotatable adjacent to said lugs, a lever pivoted on said beam contactable by said second cam, stops limiting the movement of said lever, and spring elements combined with said lever whereby a cushioning effect of the second cam is obtained, said cam being timed to advance said stylus at regular intervals.

17. In a dividing machine, a stylus carrying head comprising in combination, a slotted bracket, a beam slidable therein, a bar pivoted on said beam, a stylus carried at the free end of said bar, means for intermittently raising and lowering said stylus carrying bar, a spring impelled lever pivoted on the side of said beam, an adjustable stop for said lever, a pair of stops for said beam, a cam adapted to contact with said lever whereby said beam is advanced, and resilient means for retracting said beam.

18. In a dividing machine, a stylus carrying head comprising in combination, a slotted bracket, a beam slidable therein, a bar pivoted on said beam, a stylus carried at the free end of said bar, means for intermittently raising and lowering said stylus, resilient means for moving said beam reciprocatively, a pair of depending lugs on said beam, an annularly grooved cylinder rotatable between said lugs, geared connections between said beam moving means and said cylinder, said cylinder being slidably mounted, and its ends formed with diagonal recesses, a plurality of adjustable stops set in said lugs contactable with said cylinder, and means for moving said cylinder laterally whereby said stops may make contact with the face of said cylinder or enter the grooves and recesses formed therein, thus providing for differential length of stroke of said beam.

19. In a dividing machine, a stylus carrying head comprising in combination, a slotted bracket, a beam slidable therein, a bar pivoted on said beam, a stylus carried at the free end of said bar, means for intermittently raising or lowering said bar, a spring cushioned cam for moving said beam intermittently forward, a spring for returning said beam, a pair of depending lugs formed with said beam, a cylinder rotatable between said lugs, said cylinder having diagonal recesses in the ends, a slidable shaft on which said cylinder is mounted, a gear on said shaft, a shaft for said cam, a worm, a pinion, on said worm engaging with said gear, said gear having an annular recess in its inner side, a tooth extending into the recess, one or more adjustable stops fixed in each of said lugs directed toward the axis of said cylinder, means coöperative with said tooth for shifting said cylinder laterally at predetermined intervals, whereby said stops may make contact with said cylinder or enter the recesses therein, and means for returning said cylinder to its normal position thus controlling the length of lines made by said stylus.

20. In a dividing machine, a stylus carrying head comprising in combination, a slidable beam, a stylus actuated thereby, means for intermittently raising said stylus, means for reciprocating said beam, a pair of depending lugs formed with said beam, a cylinder slidably and rotatably mounted between said lugs, said cylinder having diagonal cam recesses in its ends, a plurality of stops adjustably secured in said lugs in the axial plane of said cylinder, means for rotating said cylinder timed with the reciprocal movements of said beam, means for moving said cylinder laterally, said means being timed in definite relations to the reciprocal movements of said beam, and means for moving said cylinder laterally adjustably controlled by an operative part of the machine whereby lines of different length are made by said stylus in any desired order.

21. In a dividing machine, a supporting frame, a worm journaled therein, a driving shaft, geared connections between said driving shaft and said worm, and means combined with said geared connections whereby intermittent impulses are transmitted to said worm at uniform intervals.

22. In a dividing machine, a supporting frame, a driving shaft rotatably mounted on said frame, a worm rotatably mounted at right angles to said driving shaft, operative connections engaged between said driving shaft and said worm, whereby said worm is intermittently rotated and held against rotation during the intermission of its movements.

23. In a dividing machine, the combination with a supporting frame, a protractor bar mounted to move universally at its end, and means for actuating said protractor bar, of a table slidable on said frame, and adjustable connections between said table and said bar whereby the movement of said bar may be variably transmitted to said table.

24. In a dividing machine, the combination with a supporting frame, a worm rotatably journaled therein, and means for rotating said worm at predetermined intervals a definite amount, of a protractor bar pivoted on said frame, operative connections between said protractor bar and said worm whereby the bar is advanced, a table movable longitudinally on said frame, adjustable connections between said table and said protractor bar whereby the movement of said bar is transmitted to said table, and means for adjusting said connections whereby the amount of movement transmitted may be increased or diminished.

In testimony whereof I have signed my name to this application.

FRANK B. GLOVER.